United States Patent [19]

Mayberry et al.

[11] Patent Number: 5,605,200

[45] Date of Patent: Feb. 25, 1997

[54] SELF ATTACHING UPPER RADIATOR MOUNT

[75] Inventors: Eric L. Mayberry, Haslett; Steven W. Abbruzzese, Lansing, both of Mich.

[73] Assignee: General Motors Corporation, Detroit, Mich.

[21] Appl. No.: 416,114

[22] Filed: Apr. 3, 1995

[51] Int. Cl.$^6$ .................................................. B60K 11/04
[52] U.S. Cl. ........................................................ 180/68.4
[58] Field of Search .............................. 180/68.4, 68.6, 180/68.1; 248/560, 614, 617, 634

[56] References Cited

U.S. PATENT DOCUMENTS

| | | | |
|---|---|---|---|
| 3,123,170 | 3/1964 | Bryant | 180/68 |
| 4,564,168 | 1/1986 | Ikuta et al. | 248/638 |
| 4,579,184 | 4/1986 | Hiramoto | 180/68.4 |
| 4,763,723 | 8/1988 | Granetzke | 165/67 |
| 4,773,496 | 9/1988 | Brielmair | 180/68.4 |
| 5,341,871 | 8/1994 | Stelzer | 180/68.4 |

FOREIGN PATENT DOCUMENTS 59-12292  1/1984  Japan.

*Primary Examiner*—Richard M. Camby
*Attorney, Agent, or Firm*—Patrick M. Griffin

[57] ABSTRACT

An upper radiator mount is self attaching and fastenerless, working in conjunction with the lifting motion by which a subframe, with attached radiator, is lifted toward and into the vehicle body. Resilient fingers on a radiator tank mounted base simultaneously slide over and grip side walls of an aligned body tie bar as the subframe is lifted. The fingers are specially designed with pivots and a web that ties them together so as to rock in and strongly grip the tie bar when it hits and compresses the web.

3 Claims, 3 Drawing Sheets

SELF ATTACHING UPPER RADIATOR MOUNT

This invention relates to vehicle radiator upper mounts in general, and specifically to such a mount that is self attaching and free of external fasteners.

BACKGROUND OF THE INVENTION

Vehicle radiators are typically sandwiched between an upper and lower vehicle frame member by a pair of resilient mounts. The resilient mounts allow the radiator to behave as a tuned mass, insulated from road shocks. Typically, the resilient mounts at both the top and bottom edge of the radiator consist of a spaced pair of rubber grommets or "donuts" that surround vertical pins fixed to the radiator, generally comprising part of the tanks. When the radiator is installed, the bottom mounts can simply be set down into matching slots in the lower frame member, retained by interference fit and the weight of the radiator alone, with no external fastener needed. The upper mount requires a bracket and external fastener, however. Other resilient mounts are more complex, consisting of block members molded with slots and flexible fins to accommodate vibrations. These, too, require brackets and external fasteners.

Such known radiator fastening systems present no particular installation problems when the vehicle is assembled by older methods, that is, when the lower and upper vehicle frame members are already set in their final positions and easily accessible. A newer assembly technique involves a lower subframe or chassis module that initially sits near the factory floor, while the rest of the vehicle body is suspended directly above. The subframe provides easy worker access for the installation of many components, such as the power train and brake. The radiator lower edge may be conveniently installed to the subframe as well. Then, the entire module is lifted upwardly and joined to the rest of the vehicle body. In this orientation, access to the brackets and fasteners of typical upper radiator mounts is difficult and awkward.

SUMMARY OF THE INVENTION

The invention provides a radiator upper mounting system that works in cooperation with the subframe-upper frame assembly technique and eliminates the need for brackets and separate fasteners. A specially designed mount aligns and attaches itself, and provides vibration isolation.

In the embodiment disclosed, the lower edge of the radiator is fixed by conventional means to the lowered subframe, in a generally vertical orientation. An upper body frame member or tie bar hangs directly above and aligned with the upper edge of the radiator. The tie bar has a generally box shaped cross section of known width, and its spatial location is known, at least within a certain up-down and fore and aft tolerance range.

A pair of resilient mounts are fixed to the top edge of the radiator, specifically to the tops of the radiator tanks. Each mount is a one piece molded rubber block with a base that sits solidly on top of a tank and a pair of upwardly extending fingers, spaced apart just less than the width of the tie bar. The ends of the fingers are formed with a pair of oppositely sloped lead in surfaces wide enough to encompass the expected fore and aft tolerance range of the tie bar. In addition, in the embodiment disclosed, the fingers are molded to an arch shaped web that can be compressed downwardly over a distance comparable to the expected up and down tolerance range of the upper tie bar. As it is compressed down, the web causes the fingers to tip toward one another.

As the subframe and radiator are moved up into the overhanging vehicle body, the lead in surfaces of the fingers find and engage the sides of the tie bar, and move up and around it in a forking motion, gripping it with at least moderate force. When the bottom of the tie bar hits and compresses the arch shaped web, the fingers are forced to grip the tie bar even more tightly. The self aligning and gripping action of the mount all occurs automatically and passively, simply as a result of lifting the subframe upwardly. No external fasteners, brackets or assembler attention are necessary.

DESCRIPTION OF THE PREFERRED EMBODIMENT

These and other features of the invention will appear from the following written description, and from the drawings, in which.

Figure 1:
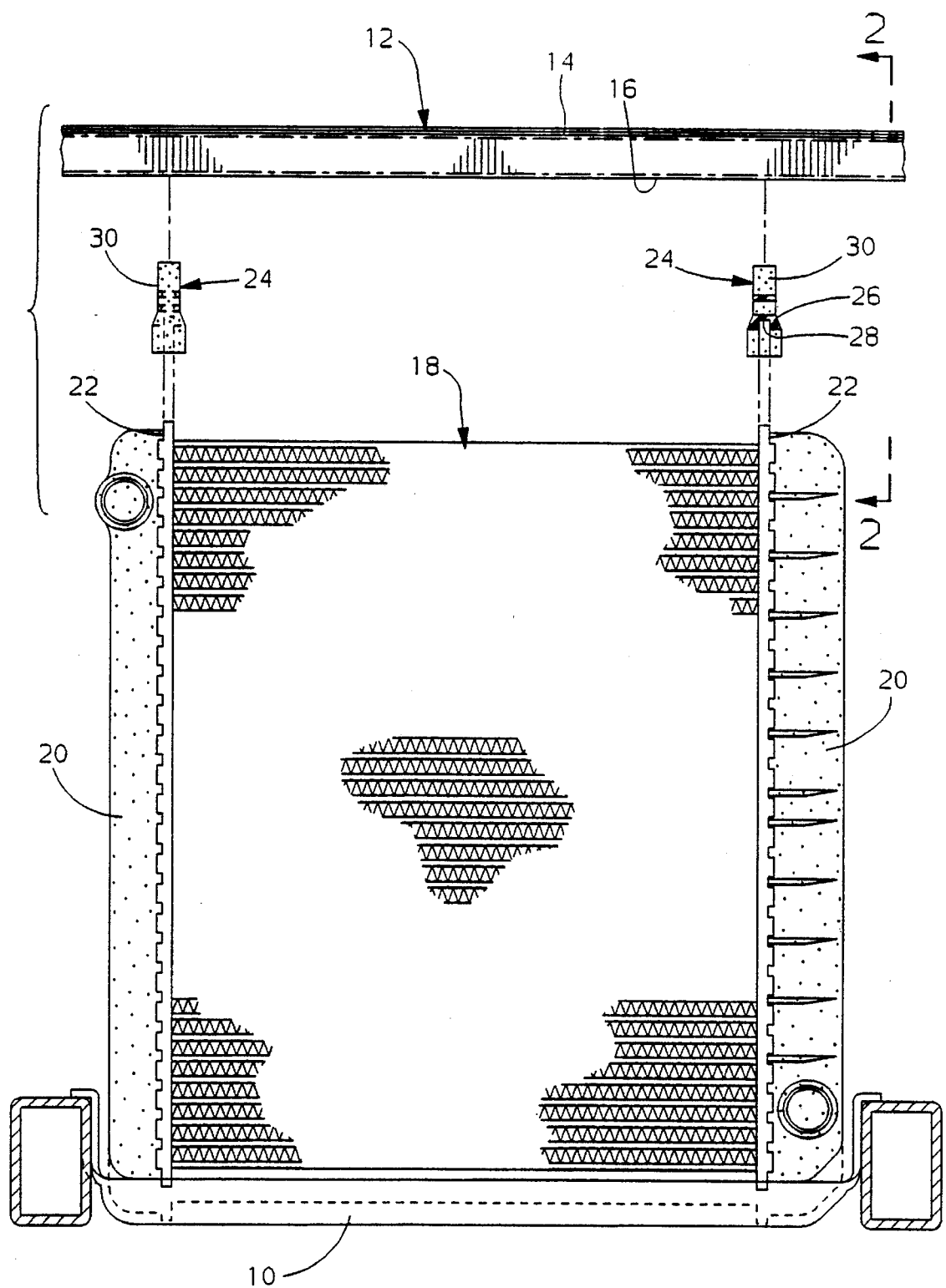
FIG. 1 is a front view of a vehicle body subframe with radiator lowered below a vehicle body upper frame member, with a pair of mounts resting between in a disassembled position.
Figure 2:
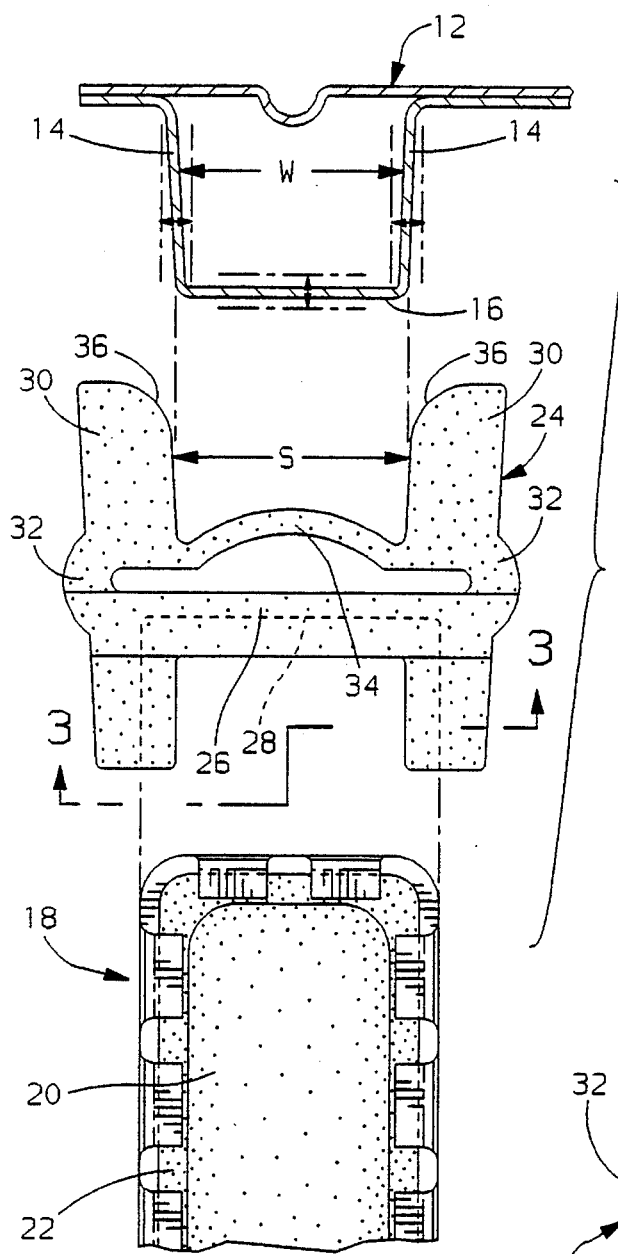
FIG. 2 is a sectional view taken along the line 2—2 of FIG. 1, showing the tolerance limit positions of the various surfaces of the upper frame member in dotted lines.
Figure 4:
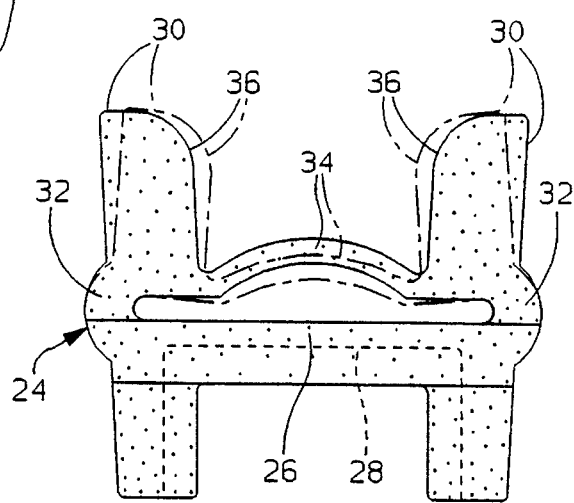
FIG. 4 is side view of a mount alone showing its tendency to flex inwardly in dotted lines.
Figure 3:
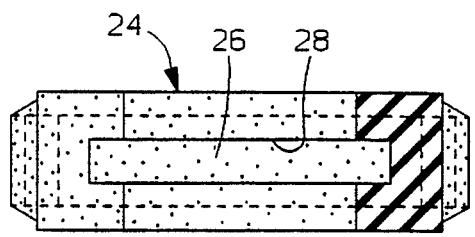
FIG. 3 is a view of the mount taken along the line 3—3 of FIG. 2.

Referring first to FIGS. 1 and 2, a vehicle includes a lower chassis module or subframe 10 and an overhanging body, of which only an upper frame member is shown, indicated generally at 12. The frame member 12 is typically referred to as a tie bar, so named because it ties the two sides of the vehicle body together near the front. It also serves as the mount for the hood latch and for other underhood components. While a tie bar is often simply a flat stamping, here it is made as an elongated box beam with generally parallel (or slightly tapered) side walls 14 and horizontal bottom wall 16. The walls 14 create an average nominal width W, which is uniform along the length of tie bar 12, though it may increase in the upward direction when the side walls 14 are tapered. The spatial positions of the side walls 14, fore and aft, and of the bottom wall 16 up and down, can vary, over an expected tolerance range, shown by the dotted lines in FIG. 2. Such tolerances are the sum result of both manufacturing variations in W but, more significantly, build variations in the final installed position of subframe 10 relative to tie bar 12. A conventional radiator, indicated generally at 18, includes a pair of spaced, parallel plastic manifold tanks 20, each of which has a central peripheral flange 22. The bottom edge of radiator 18, specifically the lower ends of the tanks 20, are fixed to the subframe 10 in a generally vertical orientation, by standard lower mounts. Mounting the lower edge of radiator 18 alone is sufficient to retain it in its vertical orientation as subframe 10 is moved upwardly, by a non illustrated lift, toward tie bar 12. Tie bar 12 is located directly above and generally aligned with the upper edge of radiator 18, at least within the tolerance range noted above. The lift for subframe 10, and the apparatus on which the vehicle body would be suspended over subframe 10, are precise enough to maintain that general alignment as radiator 18 moves up and toward tie bar 12. That upward motion alone is enough to actuate the upper mount of the invention, described next.

Referring next to FIGS. 2 through 5, the upper radiator mount of the invention, of which there are two, is indicated generally at 24. Each mount 24 is molded in one piece of a hard rubber or a suitable rubber like compound of the type generally used for motor mounts or McPherson strut damper pads. Such a compound is resilient enough to absorb road shock, but still tough and durable, with a fairly tacky surface feel. Each mount 24 has a base 26 into which is molded a thin pocket 28 designed to fit tightly down over the flange 22 at the upper end of each tank 20. Therefore, with no external fasteners, mount 24 is fixed to the top of tank 20, secured against motion in all directions but upwardly. This is one of the unique advantages of mount 24, to take advantage of the existing tank flange 22. Extending upwardly from base 26 are a pair of substantially parallel fingers 30 with a free state inner spacing S just slightly less than W. Each finger 30 is attached to base 26 by a short outboard hinge 32 that is narrower than the finger 30 itself, so that it can bend easily, at least inwardly. The lower end of each finger 30 is tied to the other across an arch shaped bridge or web 34, which limits its outward bending. Web 34 sits proximate to, but spaced above, base 26. The ends of the web 34 are tied to the inner surfaces of the fingers 30 inboard of and just above each hinge 32. Therefore, a downward pressure tending to flatten web 34 toward base 26 will tend to rock the fingers 30 inwardly toward one another, about the hinges 32, as shown by the dotted lines. The upper end of each finger 30 is also molded with a curved lead in surface 36, which are wide enough to encompass the expected fore-aft tolerance range in the tie bar side walls 14.

Figure 5:
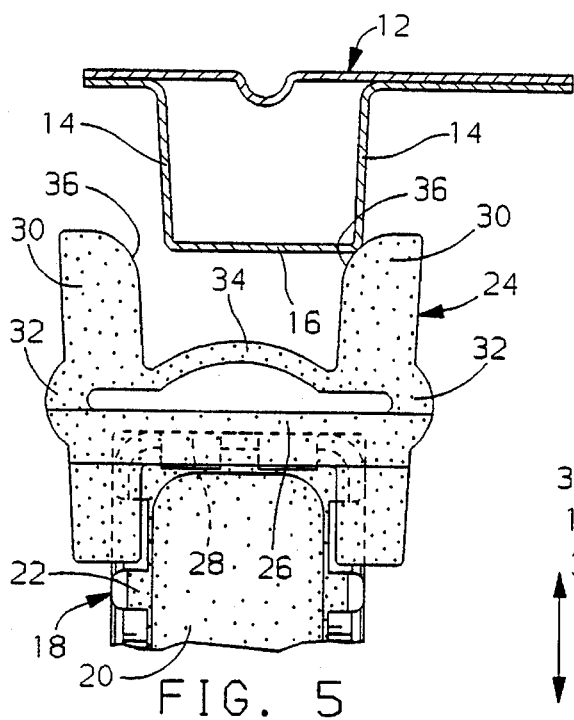
FIG. 5 is a view from the same perspective as FIG. 2, but showing the mount seated on top of a tank and moving up so as to begin to engage the upper frame member as the subframe is simultaneously lifted.
Figure 6:
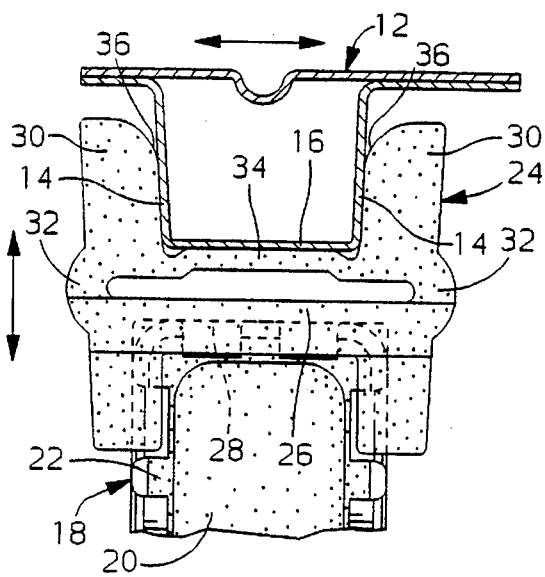
FIG. 6 is a view of the mount in a nominal installed position, near the center of the expected up-down tolerance range of the upper frame member.

Referring next to FIGS. 5 and 6, the operation of the mount 24 is illustrated. It will be understood that each of the two mounts 24 operates identically and simultaneously, though only one is described. As subframe 10 and radiator 18 are lifted, the ends of the fingers 30 approach the tie bar 12. Should the tie bar 12 in fact be shifted as far to the right away from its nominal, centered position as shown in FIG. 5, at least the right finger lead in 36 will hit the right side wall 14, or vice versa. With further upward motion, the contacted lead in 36 (or both) will guide both side walls 14 between the fingers 30, which slide over the side walls 14 in fork like fashion. In turn, because of their surface tackiness and the relationship of the free state spacing S to W, the fingers 30 will grip the tie bar side walls 14 with sufficient force to prevent significant sliding in a longitudinal direction, that is, along the length of tie bar 12. The grip tightens with further upward motion in the case where the side walls 14 are tapered. Securement in the longitudinal direction is not as important as fore and aft, the direction of the horizontal arrow of FIG. 6. In the fore-aft direction, radiator 18 is well confined, trapped on tie bar 12 by the fingers 30. Any spreading force on the fingers 30 is strongly resisted by the web 34, especially so when the web 34 is compressed.

In the up-down direction shown by the vertical arrow of FIG. 6, the radiator 18 is sandwiched solidly between the subframe 10 and tie bar 12, and the mounts 24 are uniquely able to accommodate vertical tolerance variations in the location of tie bar 12, as described next.

Figure 7:
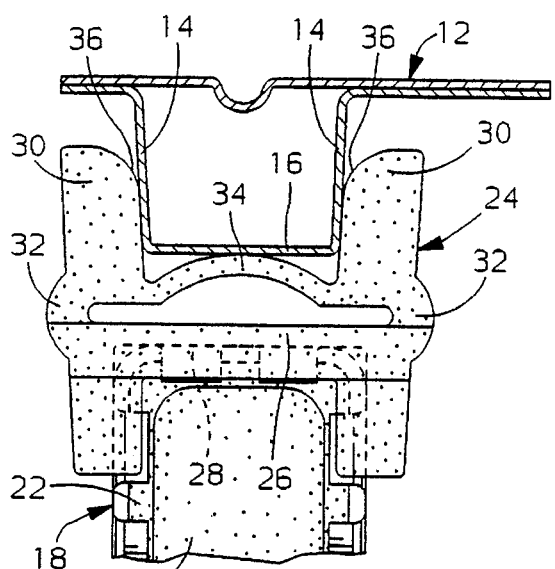
FIG. 7 is an installed view at the widest up-down tolerance.
Figure 8:
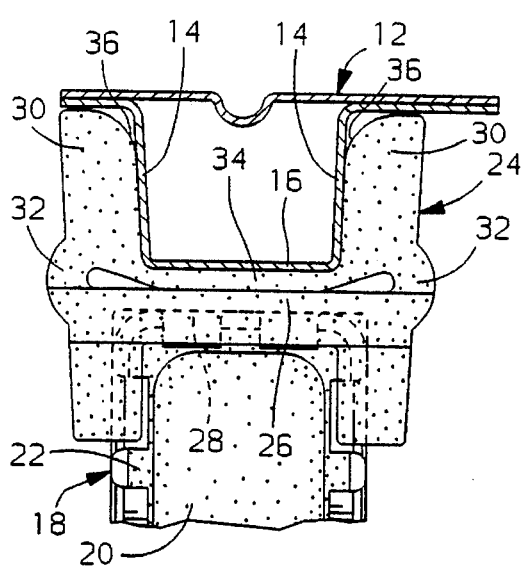
FIG. 8 is an installed view at the narrowest up-down tolerance.

Referring next to FIGS. 6 through 8, various possibilities in the up-down location of tie bar 12 are illustrated. FIG. 6 shows a nominal, average position of tie bar 12, with web 34 moderately compressed by bottom wall 16. In FIG. 7, tie bar 12 is at the "high" end of its range, and web 34 is only slightly compressed. Again, it will be recalled the fingers 30 will grip the tie bar side walls 14 sufficiently in any case, because of the relationship of S and W described above. In FIG. 8, tie bar 12 is shown at the "low" end of its range, with web 34 highly compressed by bottom wall 16, in which case the side walls 14 would be very strongly gripped by the fingers 30. If a mount 24 were not fully seated on top of a tank 20, the web 34 might also hit the base 26 as shown. This would only serve to push the tank flange 22 more deeply into the pocket 28, another advantage of the system. In addition to its static retention function, the mount 24 provides a dynamic vibration isolation as the vehicle is driven. Radiator 18 is subject to some vibration forces in the longitudinal and fore-aft directions, which the mount 24 absorbs by virtue of being a resilient rubber material. The vibrations are most pronounced in the vertical, up and down direction, of course, and the mount 24 absorbs these especially well by virtue of the web 34 and the free space between it and base 26. Even when mount 24 is fully compressed, the inherent resilience of the rubber material is sufficient, especially in combination with the resilience of the standard lower mounts used between the lower edge of radiator 18 and the subframe 10.

Variations in the embodiment disclosed could be made. Simple, solid fingers with lead in surfaces, without the web 34 and the hinges 32, would still be flexible enough to engage and self align onto the sides of the tie bar 12. The web could be simply flat, but the arch shaped web 34 is preferred because it engages the tie bar bottom wall 16 sooner, and over a wider up-down tolerance range. In fact, with assurance that the tie bar bottom wall 16 would always hit and compress the web 34, thereby tipping the fingers 30 inwardly, they could be made with a greater free state spacing S. They would then slide over the tie bar 12 more easily initially, but would still be capable of gripping the side walls 14 eventually. Tie bar 12 itself need not be a simple box beam that is uniform in width and completely coextensive with the entire upper edge of radiator 18. It would be enough if two portions of the tie bar were of the proper width and aligned with the mounts 24. However, an advantage of the box beam type tie bar 12 is that the mount fingers 30 can engage it basically anywhere along its length. Should another type of radiator by used, for example, one in which the tanks were at the top and bottom, rather than on the sides, the flange 22 would not be available for insertion into the base pocket 28 of the mount 24. The base 26 might have to be attached to the radiator upper edge in some other fashion, even with an external fastener. However, the mount 24 would still be self attaching to the tie bar 12. Most radiators do have side tanks like 20, and the way in which the mount base 26 is fixed thereto is another great advantage of the embodiment disclosed. Therefore, it will be understood that it is not intended to limit the invention to just the embodiment disclosed.

The embodiments of the invention in which an exclusive property or privilege is claimed are defined as follows:

1. A self attaching upper mounting system for a vehicle radiator having a lower edge and an upper edge, comprising, a vehicle body subframe to which said radiator lower edge is fixed in a generally vertical orientation, said subframe being movable upwardly as said vehicle is assembled a vehicle body upper frame member located above said radiator upper edge and generally aligned with said radiator upper edge, said upper frame member having a grippable portion of predetermined width, and, an upper mount having a base solidly fixed to said radiator upper edge and a pair of resilient fingers with a free state separation sufficiently smaller than said predetermined width so as to be capable of gripping said upper frame member grippable portion, said fingers further having a pair of opposed lead in surfaces located so as to engage said frame member grippable portion when said subframe and radiator are moved upwardly and thereby simultaneously slide over and grip said frame member grippable portion as said vehicle is assembled.

2. A self attaching upper mounting system for a vehicle radiator having a lower edge and an upper edge, comprising, a vehicle body subframe to which said radiator lower edge is fixed in a generally vertical orientation, said subframe being movable upwardly as said vehicle is assembled, a vehicle body upper frame member located above said radiator upper edge and generally parallel to and aligned therewith, said upper frame member having a pair of side walls of predetermined width, and, an upper mount having a base solidly fixed to said radiator upper edge and a pair of resilient fingers with a free state separation sufficiently smaller than said predetermined width so as to be capable of gripping said upper frame member side walls, said fingers further having a pair of opposed lead in surfaces located so as to engage said frame member side walls when said subframe and radiator are moved upwardly and thereby simultaneously slide over and grip said side walls as said vehicle is assembled.

3. A self attaching upper mounting system for a vehicle radiator having a lower edge and an upper edge, comprising, a vehicle body subframe to which said radiator lower edge is fixed in a generally vertical orientation, said subframe being movable upwardly as said vehicle is assembled a vehicle body upper frame member located above said radiator upper edge and generally parallel to and aligned therewith, said upper frame member having a pair of side walls of predetermined width and a bottom wall, and, an upper mount having a base solidly fixed to said radiator upper edge and a pair of resilient fingers molded to said base at a flexible outboard hinge and with a free state separation between said fingers substantially equal to said frame member side walls, the opposed inner surfaces of said fingers being tied to one another by a web proximate to and spaced from said base and engageable with said frame member bottom wall, said fingers further having a pair of opposed lead in surfaces located so as to engage said frame member side walls when said subframe and radiator are moved upwardly, whereby, when said subframe is moved upwardly, said fingers simultaneously slide over and said frame member side walls and said frame member bottom wall engages and compresses said mount web toward said mount base, thereby tending to bend said mount fingers inwardly about said hinges and grip said frame member side walls.

* * * * *